(12) United States Patent
Reinhart et al.

(10) Patent No.: US 6,346,912 B1
(45) Date of Patent: Feb. 12, 2002

(54) RADIO FREQUENCY BEACON

(75) Inventors: Matthew J. Reinhart, Crownsville; James M. Cloeren, Westminister, both of MD (US); Paul A. Bernhardt, Alexandria, VA (US); Joseph J. Suter, Ellicott City, MD (US)

(73) Assignee: The Johns Hopkins University, Baltimore, MD (US)

( * ) Notice: Subject to any disclaimer, the term of this patent is extended or adjusted under 35 U.S.C. 154(b) by 0 days.

(21) Appl. No.: 09/727,306

(22) Filed: Nov. 30, 2000

Related U.S. Application Data (60) Provisional application No. 60/198,624, filed on Apr. 20, 2000.

(51) Int. Cl.[7] .................................................. G01S 1/00
(52) U.S. Cl. ..................................................... 342/385
(58) Field of Search ................................... 342/385, 386, 342/393, 394, 436

(56) References Cited

U.S. PATENT DOCUMENTS

| | | | | |
|---|---|---|---|---|
| 3,593,139 A | * | 7/1971 | Hershberg | ...................... 325/9 |
| 3,728,485 A | * | 4/1973 | Osborne et al. | ........ 176/69.5 R |
| 3,735,407 A | * | 5/1973 | Meyer | ..................... 343/106 R |
| 3,745,559 A | * | 7/1973 | Mattern | ............... 340/347 AD |
| 4,002,980 A | * | 1/1977 | Herz | ............................. 325/3 |
| 4,019,184 A | * | 4/1977 | Dorey | .................. 343/113 DE |
| 4,183,022 A | * | 1/1980 | Baudard et al. | .......... 343/6.8 R |
| 4,218,679 A | * | 8/1980 | Bohm et al. | .............. 343/6.5 R |

* cited by examiner

Primary Examiner—Dao Phan
(74) Attorney, Agent, or Firm—Francis A. Cooch (57) ABSTRACT

An improved RF beacon for use in space/earth communications and positioning determination provides better spectral purity and frequency stability. A power supply provides regulated voltage and control signals to the beacon. Each of two oscillators operate at a slightly different frequency very near the aforementioned 16.7 MHz. The slight difference provides for a frequency selection with respect to the transmitter frequency spectra. The oscillator provides a signal to a plurality of multiplier circuits. The resulting multiplied frequency signals are fed to respective amplifiers. Some of the features of the radio frequency beacon include redundant switchable oscillators, a 1067 MHz signal having data modulation capabilities, the ability to change power levels, improved frequency stability and temperature control characteristics, and a triplexer to optionally combine the three outputs into a single port.

24 Claims, 12 Drawing Sheets

RADIO FREQUENCY BEACON

CROSS-REFERENCE TO RELATED APPLICATION

This application claims the benefit of prior filed co-pending U.S. Provisional Application Ser. No. 60/198,624, filed Apr. 20, 2000, which is incorporated herein by reference.

STATEMENT OF GOVERNMENTAL INTEREST

This invention was made with Government support under Contract No. N00024-98-D-8124 awarded by the Department of the Navy. The Government has certain rights in the invention.

FIELD OF THE INVENTION

The present invention relates generally to radio frequency beacons (RF beacons) for use in space and on the ground (terrestrial), and more specifically to a radio frequency beacon capable of broadcasting multiple signals of different frequencies simultaneously, wherein one or more of the broadcasted signals can be phase modulated to include data in the signal.

BACKGROUND OF THE INVENTION

One use for radio frequency beacons is to track the position of spacecraft that are in orbit outside the earth's atmosphere. It is important to know the position of such spacecraft as exactly as possible in order to aim ground based systems that are in communication with the spacecraft. Position information is also important to accurately interpret scientific data collected by spacecraft instrumentation for transmission back to earth.

RF beacons deployed in space face tougher performance obstacles as compared to ground based RF beacons. Chiefly, an RF beacon in space must broadcast great distances through the earth's atmosphere without a significant degradation of its signal purity. Furthermore, space based systems also face restrictions on size, weight, power, and quality or ruggedness of their design.

SUMMARY OF THE INVENTION

The present invention provides an improved RF beacon having better spectral purity and frequency stability over the current state of the art, in addition to more features. The radio frequency beacon of the present invention outputs fixed tones so that the position of the spacecraft in which it resides can be determined by means of Doppler tracking. Particular characteristics of the present invention include broadcasting coherent signals at 150 MHz and 400 MHz simultaneously thereby enabling the removal of ionospheric effects. A 1067 MHz signal can also be simultaneously broadcast. The 1067 MHz signal can be modulated with a data bit stream encoded by, or mixed with a "gold code" which is a pseudo-random code modulation scheme that allows telemetry data to be placed on the carrier without disturbing the overall phase of the 1067 MHz signal.

A power supply converts unregulated spacecraft bus power to the positive and negative DC voltages needed by the beacon electronics. There are two oscillators operating at approximately 16.7 MHz. Each oscillator operates at a slightly different frequency to provide for frequency selection with respect to the transmitter frequency spectra. The oscillators are redundant meaning that only one need be operating at any given time and the other serves as a backup in case of a failure, or if a slight frequency change is desired. The RF beacon can switch between the oscillators by remote command. Each oscillator also contains a heater control element to help maintain optimal performance. Whichever oscillator is in use simultaneously provides a signal to a times-8 and a times-9 multiplier circuit. The times-9 multiplied 16.7 MHz signal is approximately equivalent to a 150 MHz signal, which is then fed to an amplifier that provides a 150 MHz output signal. The times-8 multiplied 16.7 MHz signal is approximately equivalent to a 133 MHz signal. It is multiplied again by a times-3 multiplier to produce approximately a 400 MHz signal which is then fed to an amplifier that provides a 400 MHz output signal. A 1067 MHz output signal is obtained by multiplying the original 16.7 MHz oscillator reference signal by a times-8 multiplier and then by another times-8 multiplier. The resulting twice multiplied signal is fed to a phase modulator and is modulated by a pseudo random encoded data stream. The output of the phase modulator is approximately a 1067 MHz signal that is phase modulated. This phase modulated signal is then fed to an amplifier which outputs a 1067 MHz signal. All of the amplified output signals are then fed to individual antennas and broadcast. Another variant of the present invention combines the three outputs into a single port by means of a triplexer circuit. A single multi-band antenna can be used in this case to simplify spacecraft cabling and minimize the space needed for mounting antennas.

Some of the features of the RF beacon of the present invention include redundant switchable oscillators, a 1067 MHz signal having data modulation capabilities, the ability to change power levels, improved frequency stability and temperature control characteristics, and an optional three-way combined output with a single output port.

Other aspects and features of the present invention will become apparent to those ordinarily skilled in the art upon review of the following description of specific embodiments of the invention in conjunction with the accompanying figures.

DETAILED DISCLOSURE OF THE INVENTION

The present invention provides an improved RF beacon for use in space/earth communications and positioning determination. The RF beacon of the present invention provides better spectral purity and frequency stability.

Figure 1:
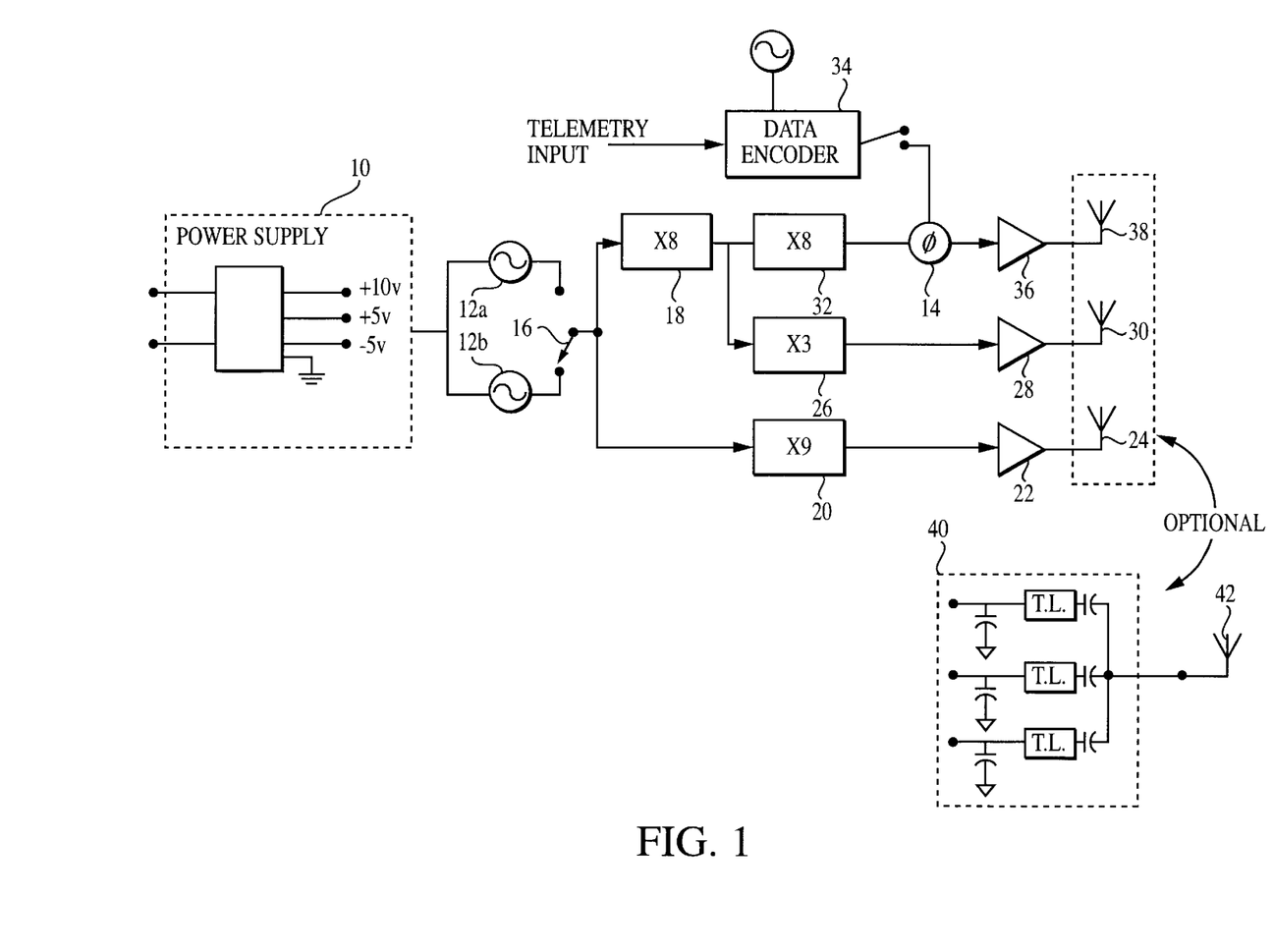
FIG. 1 is a block diagram of the circuit elements that comprise the RF beacon of the present invention.

FIG. 1 is a block diagram of the elements that comprise the RF beacon of the present invention. A power supply 10 powers two oscillators 12a 12b, an analog switch 16, multipliers 18 20 26 32, amplifiers 22 28 36, and a telemetry data encoder 34. Power supply 10 is also equipped to alter the amplifier bias points and thus provide different levels of power out of the RF beacon depending on the particular needs of the user. Each oscillator operates at a slightly different frequency very near 16.7 MHz. Analog switch 16 allows selecting either oscillator 12a 12b by remote control, enabling the user to change the operating frequency. Oscillators 12a 12b are redundant and the system can switch between them. Each oscillator also contains heater control circuitry to help maintain optimal performance. Whichever oscillator 12a,12b is in use provides a signal to both a times-8 18 and a times-9 20 multiplier circuit.

The times-9 multiplied 16.7 MHz signal is approximately equivalent to 150 MHz. It is then fed to an amplifier 22 that provides a 150 MHz output for broadcast over a crossed dipole antenna 24.

The times-8 multiplied 16.7 MHz signal is approximately equivalent to 133 MHz. It is multiplied again by a times-3 multiplier 26 to produce approximately 400 MHz. The multiplied signal is then fed to an amplifier 28 that provides a 400 MHz output. The amplified 400 MHz output is broadcast over another crossed dipole antenna 30.

A 1067 MHz carrier signal is obtained by multiplying the original 16.7 MHz oscillator signal by a times-8 multiplier 18 and then by another times-8 multiplier 32. The resulting signal is fed to a phase modulator 14 where it is modulated by data encoded with a pseudo random code. The data encoder 34 mixes the telemetry data with the pseudo-random code word via an exclusive-or logic gate. The code word bit rate is faster than the data rate, so the combination of these digital signals appears to remain a random bit stream. The result is a signal that is approximately 1067 MHz and phase modulated with encoded telemetry data. The data encoder is also shown with an in-line switch, to enable the user to remotely disable the modulation, leaving a continuous wave (CW) signal if desired. This signal is then fed to an amplifier 36 which outputs a 1067 MHz signal. The phase modulated, amplified 1067 MHz output is broadcast over a helix antenna 38.

With respect to the 1067 MHz signal, both the data encoder 34 and amplifier 36 can be switched on or off. If just the data encoder 34 is switched off then no data is included with the signal.

The RF beacon can simultaneously broadcast three (3) distinct, coherent signals at three (3) distinct frequencies. Broadcasting at 150 MHz and 400 MHz simultaneously enables the RF beacon to neutralize the effects of the ionosphere when broadcasting to earth. The three signals can be broadcast over separate antennas or combined in a triplexer 40 and broadcast over a multi-band antenna 42.

Triplexer 40 is a combination of three bandpass filter networks with a common node. The filters are phase adjusted so that each path does not load down the other two. This circuit is realized in the present invention as a combination of high impedance transmission lines and discrete capacitors.

The phase modulated 1067 MHz signal allows the RF beacon to piggyback scientific data onto the signal without disrupting the overall phase of the 1067 MHz signal.

The frequencies described in reference to FIG. 1 are illustrative in nature and are not intended to restrict the present invention in any way. Thus, the oscillator, for instance, can generate a frequency other than 16.7 MHz, and/or the multipliers can have different multiplication factors leading to different desired broadcast frequencies creating a radio frequency beacon capable of simultaneous transmission of multiple frequency signals without departing from the spirit or scope of the present invention.

FIGS. 2–13 are illustrations of the elements of one example of a radio frequency beacon that can be built to desired specifications, namely, a beacon that can broadcast simultaneously at 150 MHZ, 400 MHz, and 1067 MHz. One of ordinary skill in the art can readily alter certain values of many of the circuit components of the elements described herein to achieve desired results other than those set out in the description of FIGS. 2–13. The use of a specific example is not intended in any way to limit the scope of the concept of the present invention.

Moreover, circuit topology other than that described herein can be implemented to achieve the functional equivalent of the circuits of the present invention without departing from the spirit or scope of the present invention.

Figure 2:
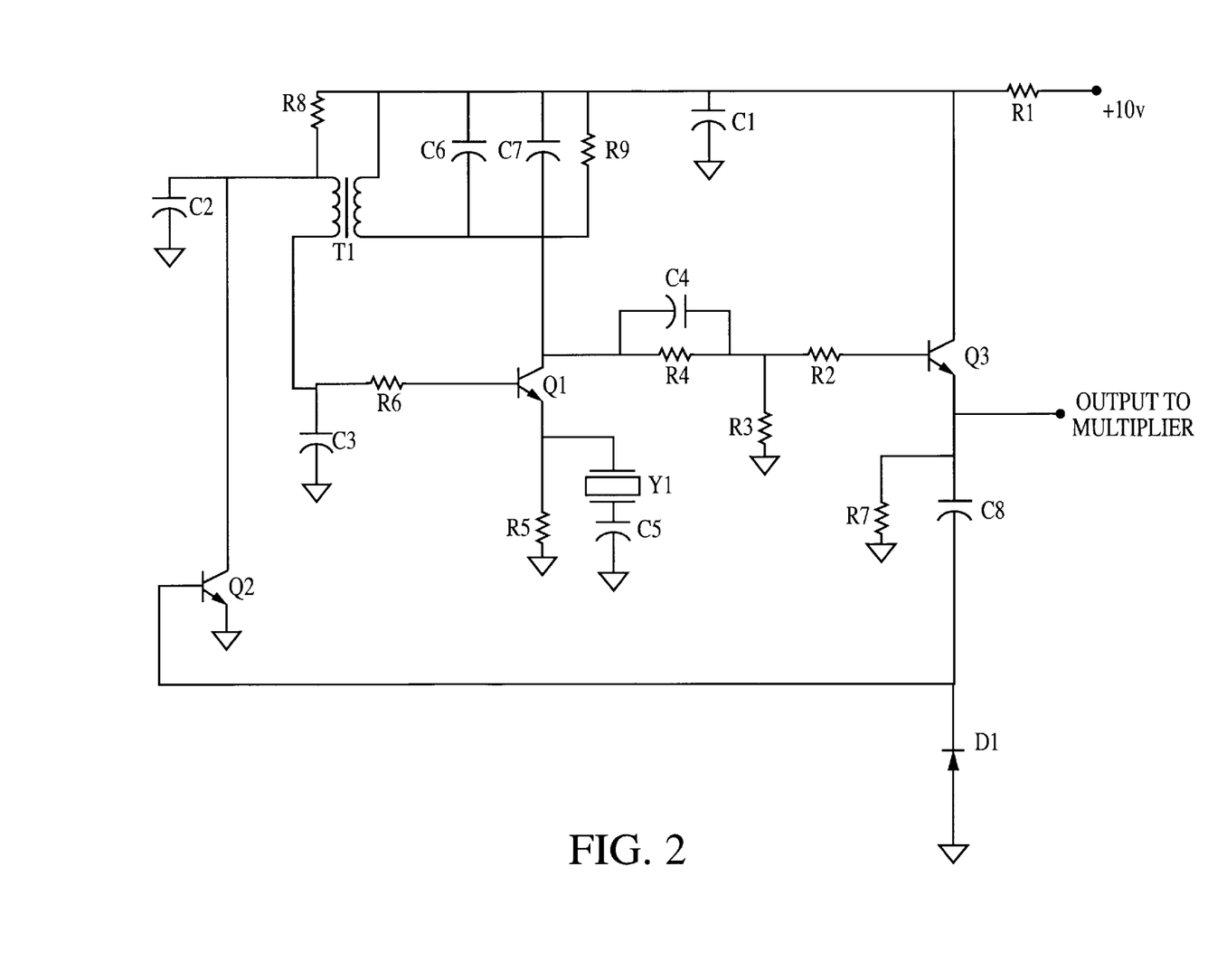
FIG. 2 is a circuit diagram of an oscillator.

FIG. 2 is a circuit diagram of oscillator 12a of FIG. 1. Oscillator 12b is almost identical to oscillator 12a except that each generates a slightly different reference frequency by utilizing a crystal resonator Y1 tuned to a different frequency. The oscillator resembles a common emitter Hartley oscillator. Transistor Q1 is the oscillator transistor. Transformer T1 is in the collector of transistor Q1 and provides positive feedback to the base of transistor Q1 in order to provide oscillation. The oscillating voltage is limited by transistor Q2 acting as a diode together with a diode D1 connected to ground. The Q2/D1 portion of the circuit limits the amplitude on the base of transistor Q1 to 1.2 volts peak-to-peak. Crystal Y1 controls the impedance in the emitter of transistor Q1 such that only when crystal Y1 is series resonant, the entire circuit is able to oscillate. When crystal Y1 is off resonance, the circuit cannot oscillate because emitter resistor R5 is too large to produce the gain required to oscillate. The output of transistor Q1 is delivered to transistor Q3 which is a standard emitter follower. The output of transistor Q3 leads to one or more multiplier circuits. The purpose of the oscillator is to provide the reference frequency for the three (3) RF beacon frequencies (1067 MHz, 400 MHz, and 150 MHz) used by the RF beacon of the present invention.

One of ordinary skill in the art can readily augment values of certain circuit elements within the foregoing oscillator circuit to achieve alternative results or may even alter the topology of the circuit described without departing from the spirit or scope of the present invention.

Figure 3:
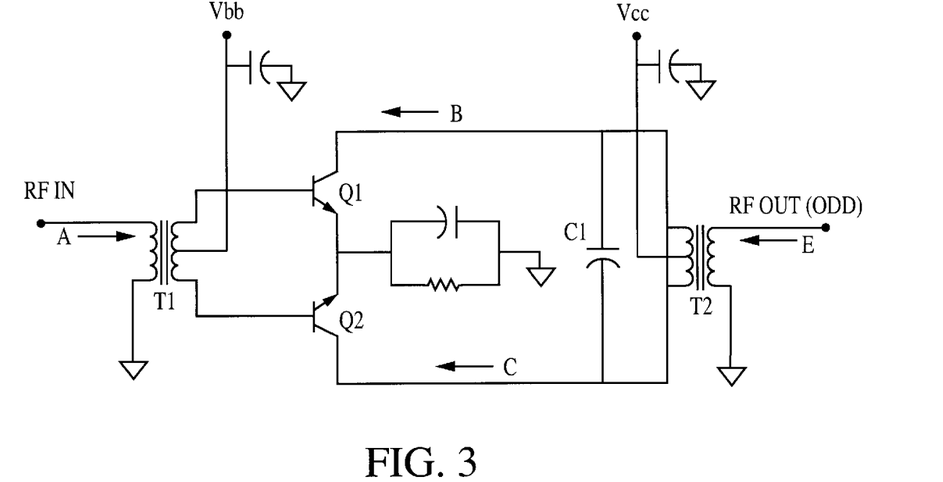
FIG. 3 is a circuit diagram of a generic odd harmonic multiplier.

FIG. 3 is a circuit diagram of a generic odd harmonic multiplier. The odd harmonic frequency multiplier operates by driving a balanced transistor pair Q1, Q2 in a push-pull configuration. A push-pull configuration is when the base and collector currents are driven 180 degrees out of phase relative to the other transistor by transformer T1. Transistors Q1 and Q2 are biased so that they conduct during only part of the input sinewave, creating a severe nonlinearity resulting in harmonic generation. The bias point can be adjusted to alter the conduction angle, or duration of turn-on, thereby producing a waveform that favors the desired harmonic. In contrast, conventional harmonic multipliers indiscriminately generate harmonics that monotonically decay for higher order harmonics. The collector outputs are combined to feed a tuned LC circuit in such a way as to cancel the even harmonics of the input. A secondary winding is added to the inductor to produce an output signal as depicted by transformer T2. C1 and T2 are tuned to resonate at the desired output frequency. Transistors Q1, Q2 are a matched pair in a common package. This helps to help maintain the balanced circuit operation, which enhances the odd harmonics relative to the even harmonics. Reducing the adjacent even harmonics greatly eases subsequent filtering requirements as close-in spurious components are more difficult to filter out than spurious components that are further away.

Figure 4:
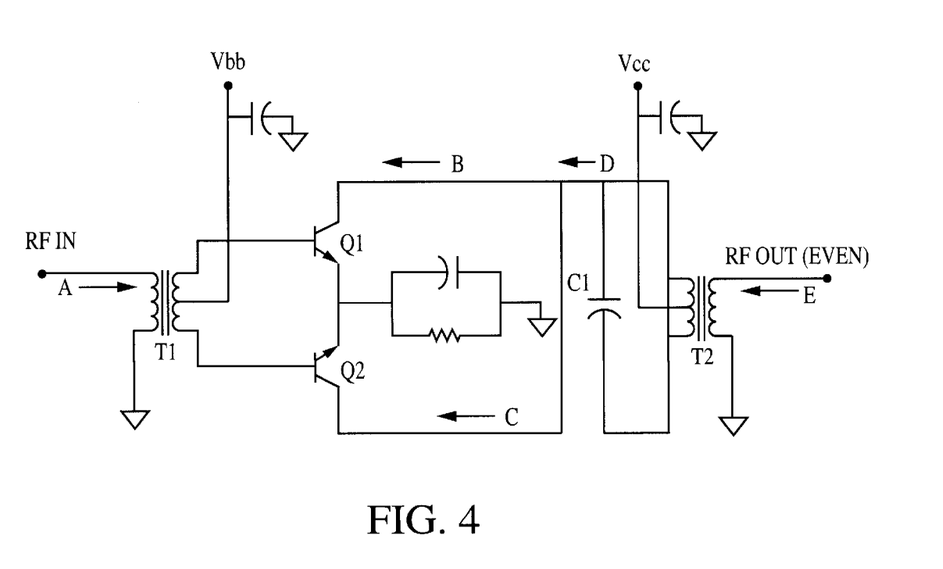
FIG. 4 is a circuit diagram of a generic even harmonic multiplier.

FIG. 4 is a circuit diagram of a generic even harmonic multiplier. The even harmonic multiplier is a sister topology to the odd harmonic multiplier. Again a balanced transistor pair Q1, Q2 is driven out of phase by a transformer T1. For the even harmonic multiplier, however, the outputs are combined in phase to form a push-push configuration. The transistors alternately sink current out of the tuned LC circuit with every half cycle of the input signal, thereby supporting only the even harmonic waveforms. The fundamental tone and odd harmonics are canceled out. Again, altering the bias point and thus the conduction angle provides a waveform that favors the desired harmonic. A secondary winding is added to the inductor to produce an output signal as depicted by T2. The design relies on the two parallel paths of the multiplier being electrically equivalent and balanced to minimize the odd harmonics.

Figure 5:
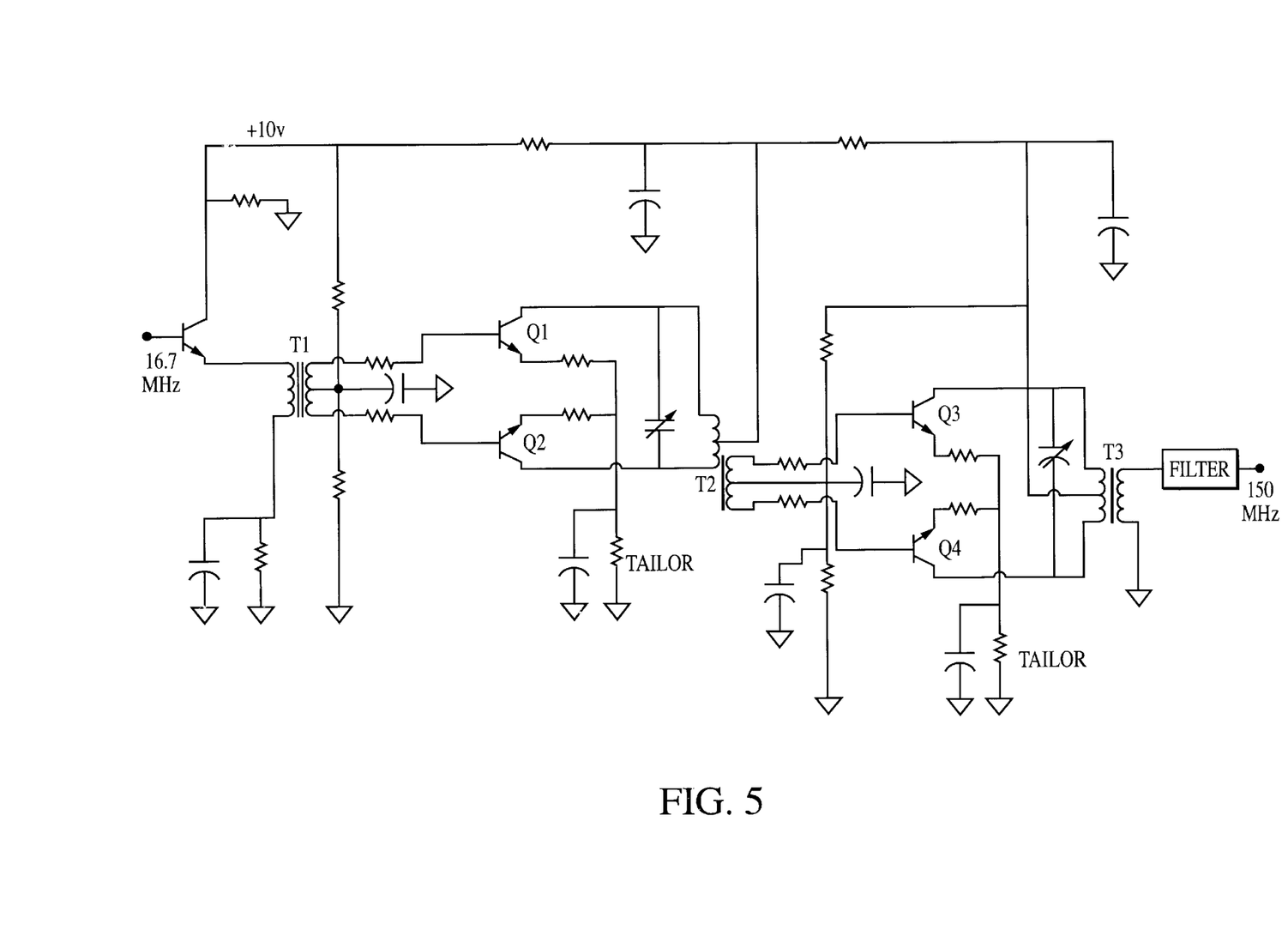
FIG. 5 is a circuit diagram of a times-9 multiplier.

FIG. 5 is a circuit diagram of a times-9 multiplier for use with the present invention. The times-9 multiplier is actually a series combination of a pair of times-3 multipliers. The first times-3 multiplier is fed by the emitter follower transistor of the oscillator (Q3 of FIG. 2). This drives a transformer, T1, that creates a differential, 180 degrees out of phase, signal to a transistor pair Q1 and Q2. Transistors Q1 and Q2 are matched to yield an equal gain in their respective circuits. Transistors Q1 and Q2 together drive a resonant LC circuit that is tuned to a desired frequency using a push-pull configuration. The multiplier circuit is optimized for certain odd harmonics thereby simplifying filter requirements for knocking out adjacent even harmonics and undesired odd harmonics. The inductive part of the tuned circuit also includes a secondary winding to comprise a transformer, T2. The secondary winding of transformer T2 can be used to drive another times-3 multiplier circuit. Using the same basic circuit topology, a second matched pair of transistors Q3 and Q4 are driven 180 degrees out of phase such that their respective outputs are also 180 degrees out of phase. Transistors Q3 and Q4 also drive a resonant LC circuit that is tuned to a desired frequency using a push-pull configuration. The inductive part of the tuned circuit comprises a portion transformer, T3. The secondary winding of transformer T3 provides the desired output, 150 MHZ in this case. A bandpass filter is shown at the output to further improve the spectral purity of this signal.

One of ordinary skill in the art can readily augment values of certain circuit elements within the foregoing multiplier circuit to achieve alternative results or may even alter the topology of the circuit described without departing from the spirit or scope of the present invention.

Figure 6:
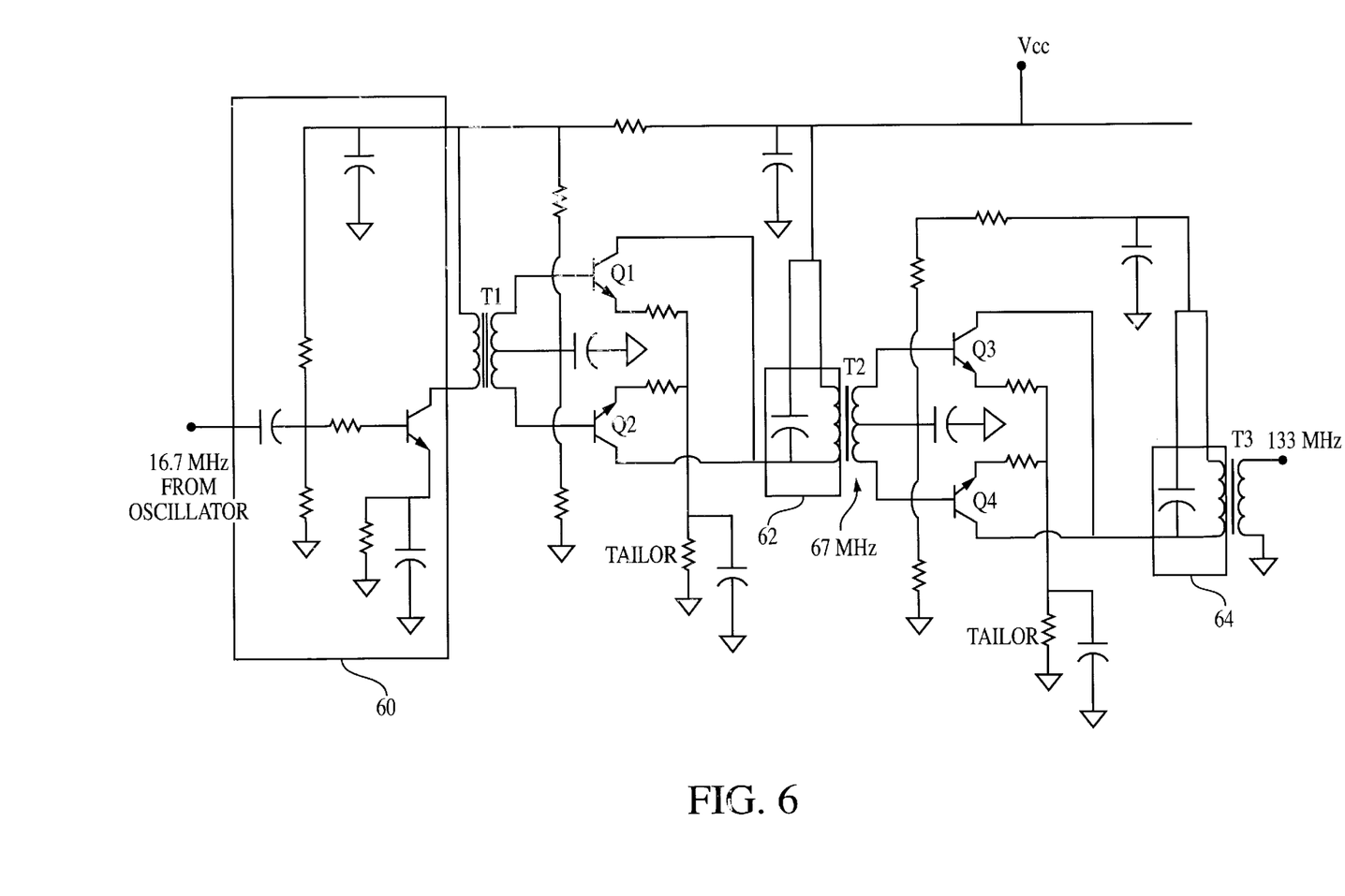
FIG. 6 is a circuit diagram of a times-8 multiplier.

FIG. 6 is a circuit diagram of a times-8 multiplier circuit for use with the present invention. The times-8 multiplier is a series combination of a times-4 and a times-2 multiplier. A common emitter transistor amplifier circuit 60 boosts the signal level of the oscillator output and feeds the times-4 multiplier. This drives a transformer T1 that creates a differential, 180 degrees out of phase, signal to a transistor pair Q1 and Q2. Transistors Q1 and Q2 are matched to yield an equal gain in their respective circuits. Transistors Q1 and Q2 together drive a resonant LC circuit 62 in such a way as to favor even harmonics and is tuned to the desired frequency. The inductive part of the tuned circuit also includes a secondary winding to comprise a transformer, T2. The secondary winding of transformer T2 is used to drive a times-2 multiplier circuit.

Using the same basic circuit topology, a second matched pair of transistors Q3 and Q4 are driven 180 degrees out of phase such that their respective outputs are also 180 degrees out of phase. Transistors Q3 and Q4 also drive a resonant LC circuit 64 in such a way as to again favor even harmonics and is tuned to the desired frequency. The inductive part of the tuned circuit comprises a portion of transformer, T3. The secondary winding of transformer T3 provides the desired output, 133 MHz in this case.

One of ordinary skill in the art can readily augment values of certain circuit elements within the foregoing multiplier circuit to achieve alternative results or may even alter the topology of the circuit described without departing from the spirit or scope of the present invention.

Figure 7:
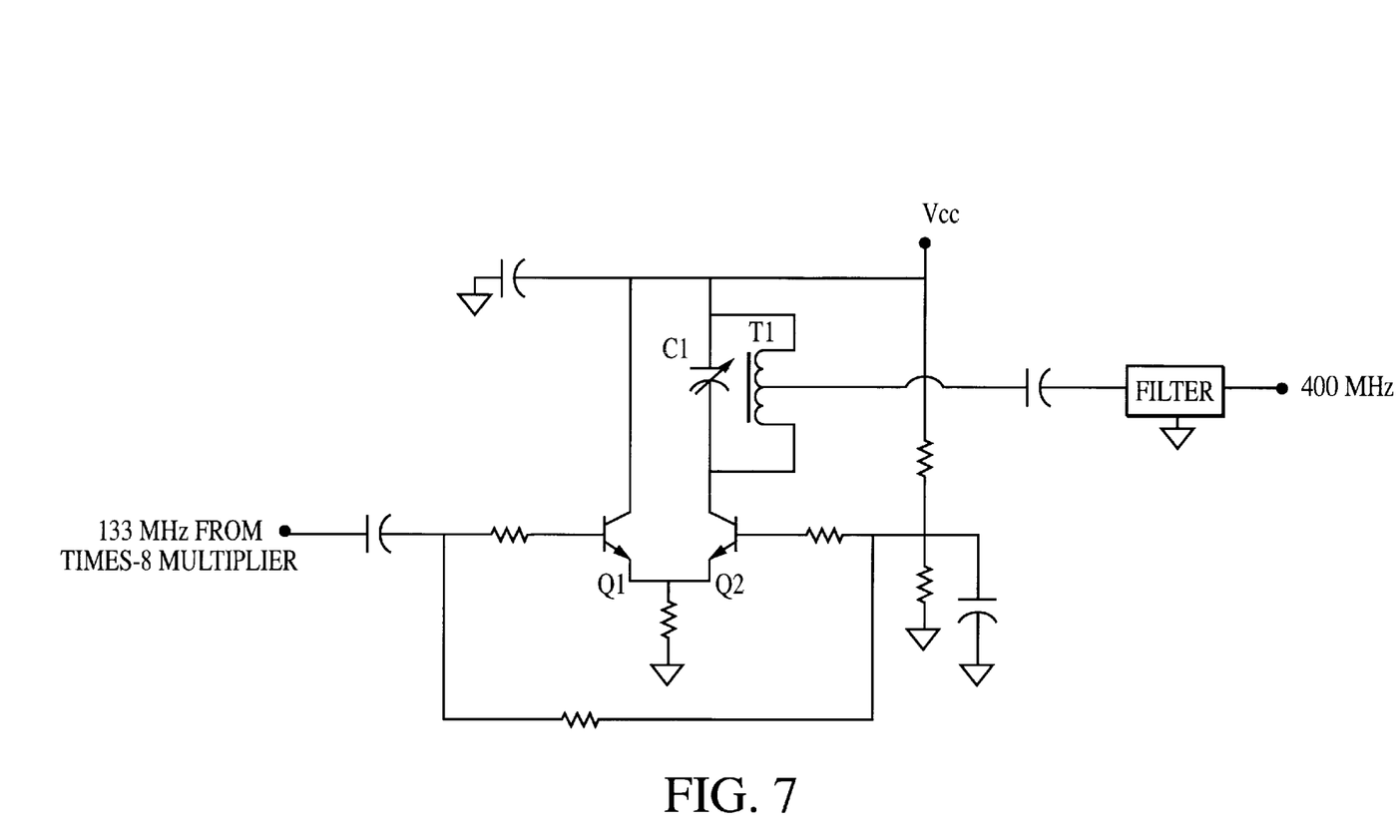
FIG. 7 is a circuit diagram of a high frequency times-3 multiplier.

FIG. 7 is a circuit diagram of a high frequency times-3 multiplier for use with the present invention. The times-3 multiplier receives 133 MHz from the times-8 multiplier and generates 400 MHz. This multiplier is different from the previously described generic odd order multiplier (FIG. 3) because this topology performs better at higher frequencies. This multiplier is comprised of a differential, emitter coupled pair of transistors, Q1 and Q2. The transistors are biased to favor the desired harmonic, and a tuned circuit composed of T1 and C1 resonates at the output frequency. A bandpass filter is shown at the output to further improve the spectral purity of this signal.

One of ordinary skill in the art can readily augment values of certain circuit elements within the foregoing high frequency multiplier circuit to achieve alternative results or may even alter the topology of the circuit described without departing from the spirit or scope of the present invention.

Figure 8:
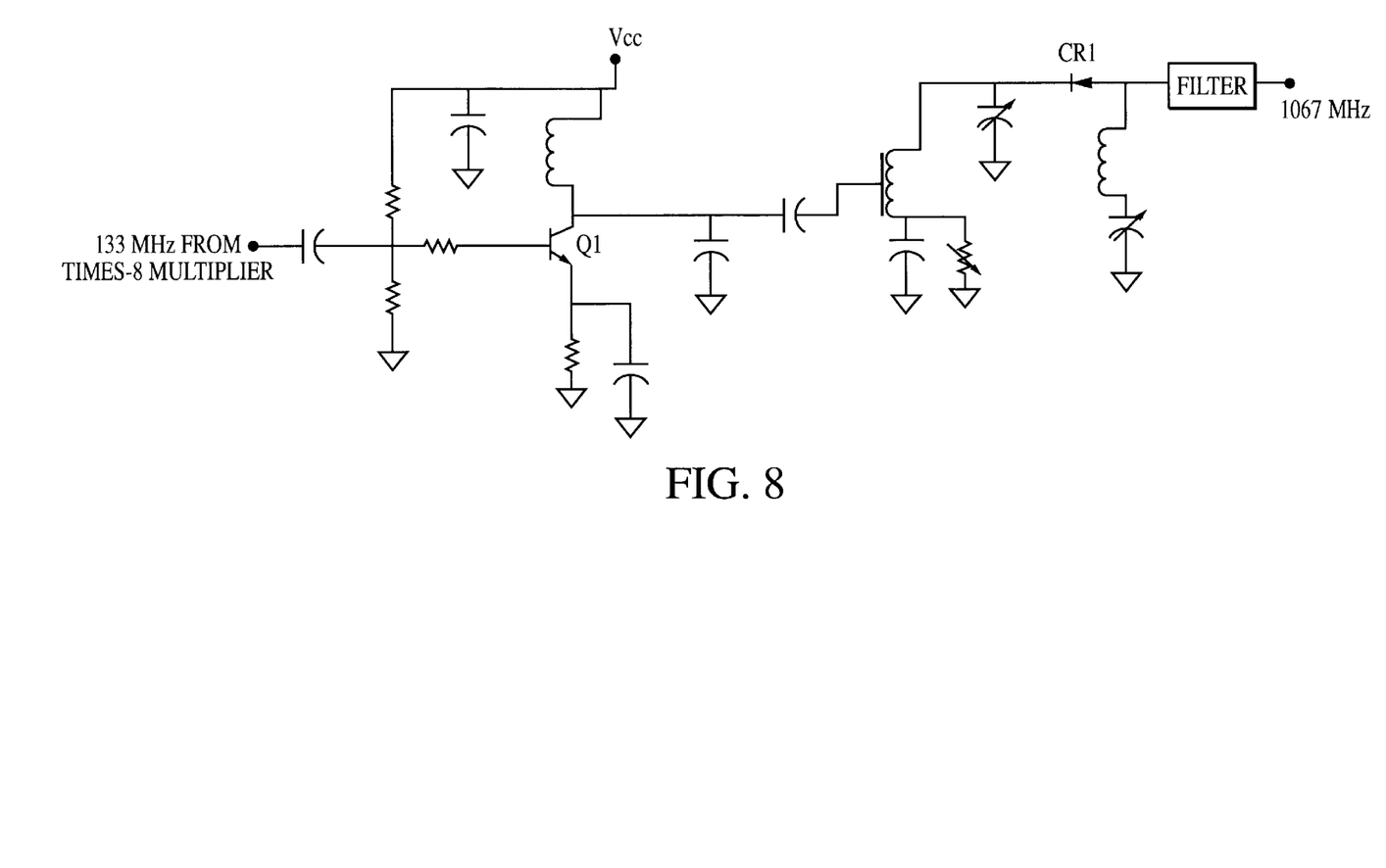
FIG. 8 is a circuit diagram of a high frequency times-8 multiplier.

FIG. 8 is a circuit diagram of a high frequency times-8 multiplier for use with the present invention. The times-8 multiplier receives 133 MHz from a previous times-8 multiplier and generates 1067 MHz. This multiplier is different from the previously described generic even order multiplier (FIG. 4) because this topology performs better at higher frequencies. This multiplier is comprised of common emitter transistor amplifier, Q1 that drives diode CR1 with a large amplitude signal. The diode generates a comb-line of harmonic frequencies that can be selectively filtered. A bandpass filter is shown at the output to select the desired, eighth harmonic signal at 1067 MHz. The other circuit elements shown are to bias the transistor and impedance match the multiplier for optimum performance.

One of ordinary skill in the art can readily augment values of certain circuit elements within the foregoing high frequency multiplier circuit to achieve alternative results or may even alter the topology of the circuit described without departing from the spirit or scope of the present invention.

Figure 9:
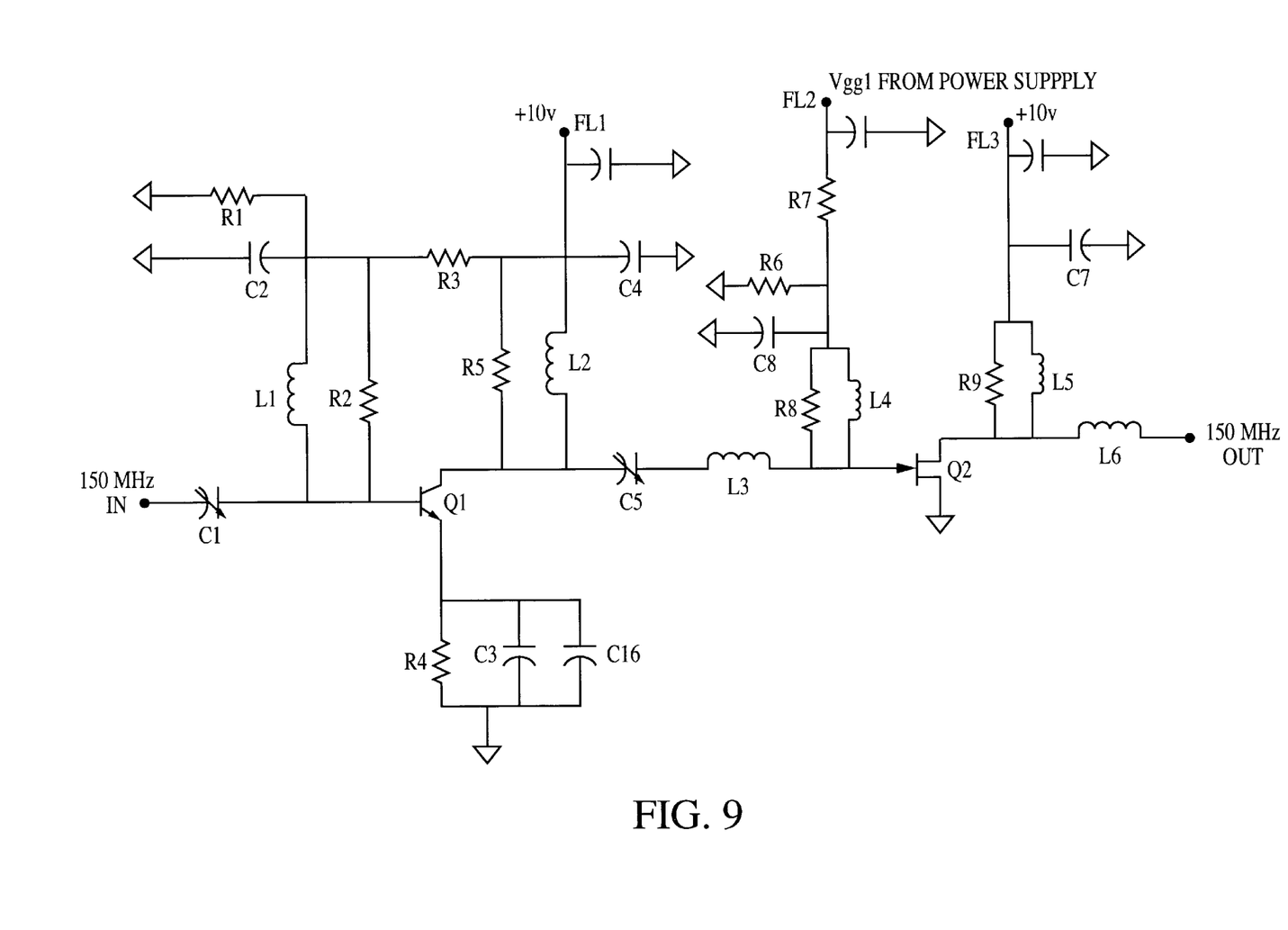
FIG. 9 is a circuit diagram of a 150 MHz amplifier.
Figure 10:
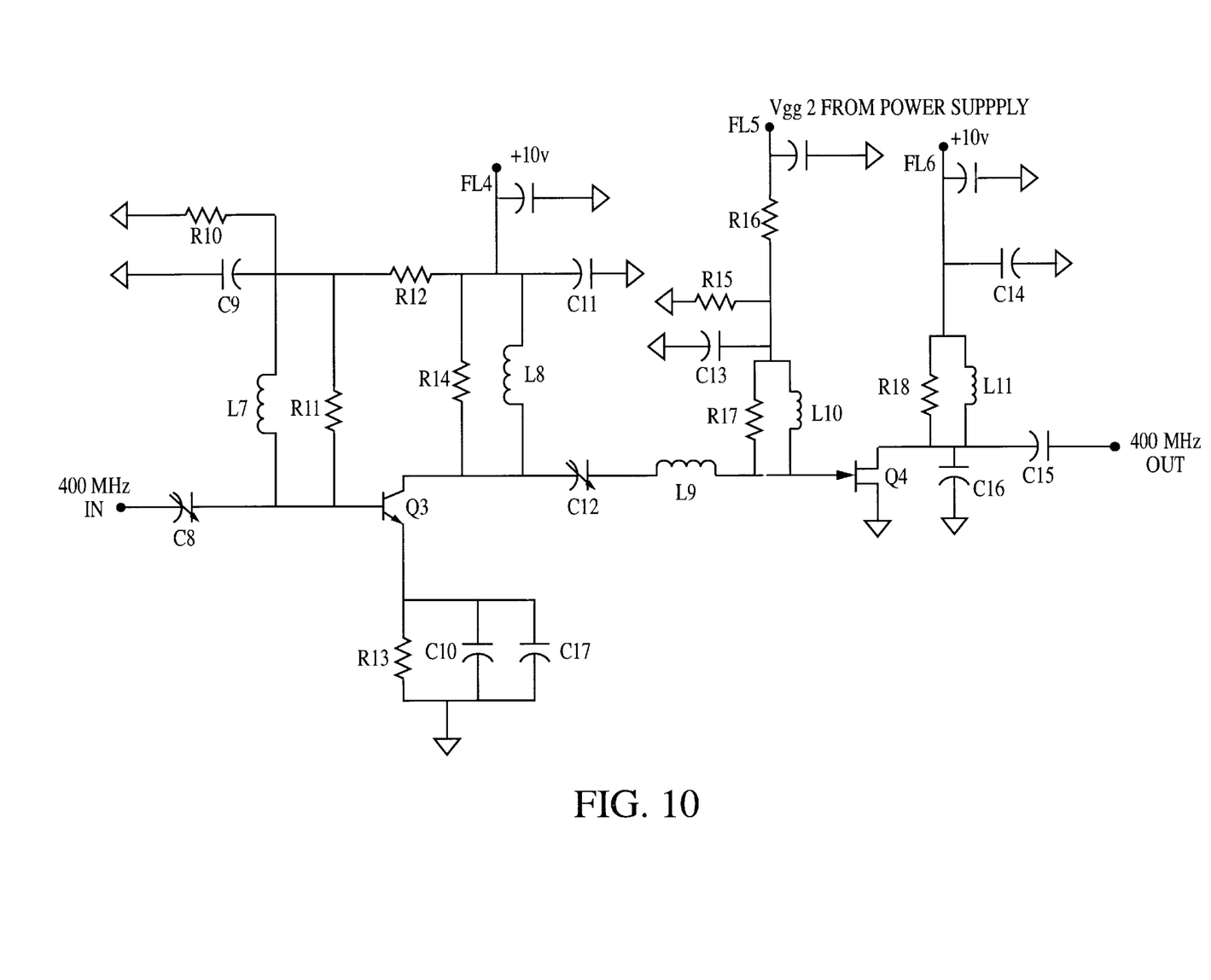
FIG. 10 is a circuit diagram of a 400 MHz amplifier.

FIGS. 9 and 10 are circuit diagrams of different amplifiers for use with the present invention. FIG. 9 is a two-stage 150 MHz amplifier where stage one is a pre-amplifier characterized by a common emitter transistor and stage two is a common source FET transistor type amplifier. The first stage pre-amplifier is a lower power amplifier comprised mainly of transistor Q1. Transistor Q1 is a common emitter amplifier with impedance matching. The circuit has a 50 ohm characteristic impedance input and output. Also included is a series capacitor shunt inductive type matching network (L1/C1 and L2/C5) on both the input and output of transistor Q1. Resistors R2 and R5 are stabilization resistors that serve to suppress spurious oscillations that sometimes occur in RF amplifiers. Resistor R4 provides negative feedback to stabilize the DC bias point.

The second stage FET amplifier comprises a common source FET transistor Q2 having matching networks on the input and output of FET transistor Q2. The topology of this stage is somewhat different from the topology of stage one because a FET transistor has a different characteristic impedance which is externally matched to 50 ohms. Being a higher power device, the impedance of Q2 is also much lower than Q1, requiring further impedance transformation to reach 50 ohms. The stage two circuit uses a series inductor L3 and a shunt inductor L4 on FET transistor Q2 input and a series inductor L6 and a shunt inductor L5 on FET transistor Q2 output as matching networks. Resistors R8 and R9 are used to stabilize the stage two portion of the 150 MHz amplifier. The output of the circuit is approximately 2 watts with a 23 dB overall gain, but appropriate device selection can readily alter the power capability.

FIG. 10 is a two-stage 400 MHz amplifier where stage one is a pre-amplifier characterized by a common emitter transistor and stage two is a common source FET transistor type amplifier. The 400 MHz amplifier circuit is virtually identical to the 150 MHz amplifier circuit in topology. The 400 MHz amplifier circuit uses different component values and a different final output transistor in order to operate at 400 MHz as opposed to 150 MHz and with a different power level. The output of the circuit is approximately 4 watts with a 24 dB overall gain. Again, appropriate device selection can readily alter the power capability.

Figure 11A:
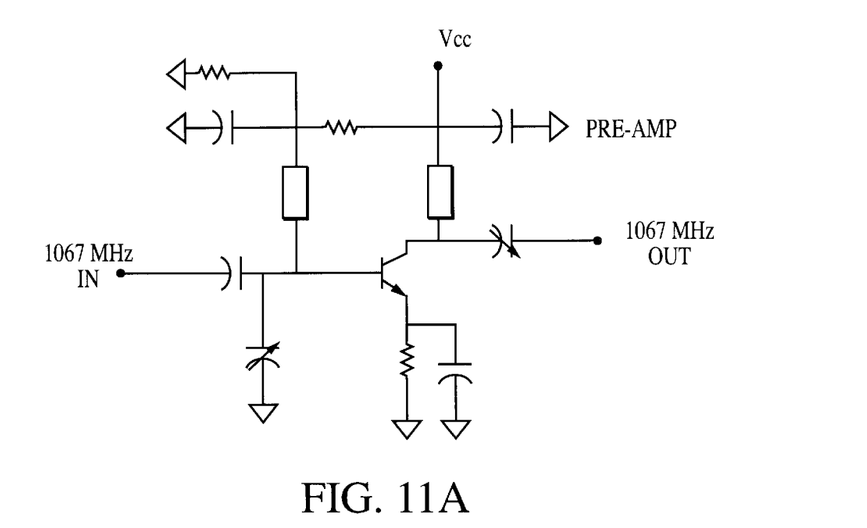
FIG. 11A is a circuit diagram of a 1067 MHz pre-amplifier.
Figure 11B:
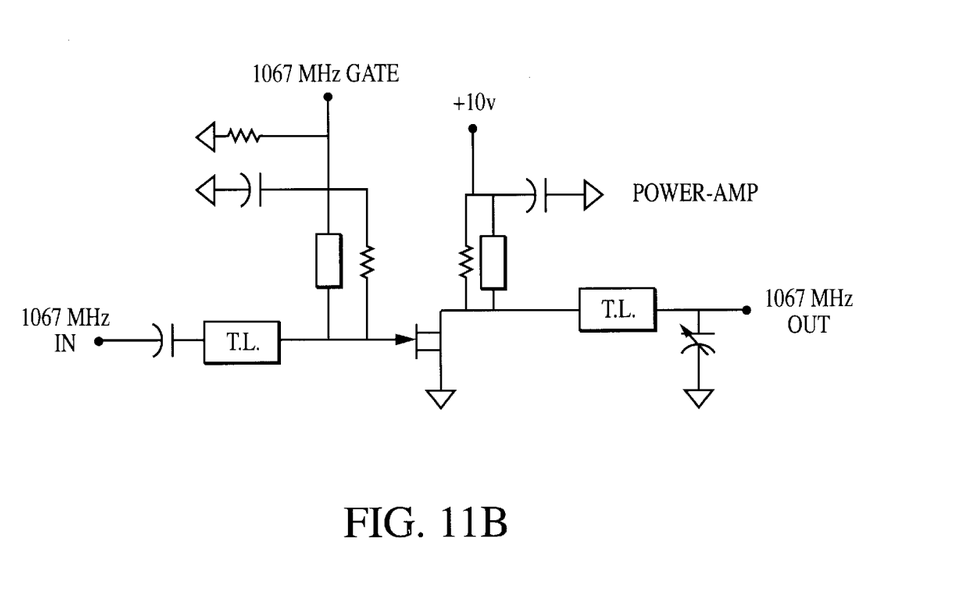
FIG. 11B is a circuit diagram of a 1067 MHz power amplifier.

FIGS. 11A and 11B comprise another amplifier circuit. This time the circuit operates at 1067 MHz and again includes a pre-amplifier and power amplifier stage. FIG. 11A is the pre-amplifier stage. This amplifier is similar to the first stage of the 150 MHz and 400 MHz amplifiers, except that distributed elements, in the form of microstrip transmission lines have replaced the inductors. At high frequencies, discrete inductors become impractical, so high impedance, narrow transmission lines become necessary. The impedance matching network is revised to cope with the higher frequency operation.

FIG. 11B is the power amplifier stage. This amplifier is similar to the final output amplifier stage of the 150 MHz and 400 MHz amplifiers. Again, distributed elements, in the form of microstrip transmission lines have replaced the discrete inductors. The 1067 MHz amplifier circuit uses different component values and a different final output transistor in order to operate at 1067 MHz and with a different power level. The output of the prototype circuit is approximately 1 watt with a 20 dB overall gain. Appropriate device selection can readily alter the power capability.

One of ordinary skill in the art can readily augment values of certain circuit elements within the foregoing amplifier circuits to achieve particular results or may even alter the topology of the circuits described without departing from the spirit or scope of the present invention.

Figure 12:
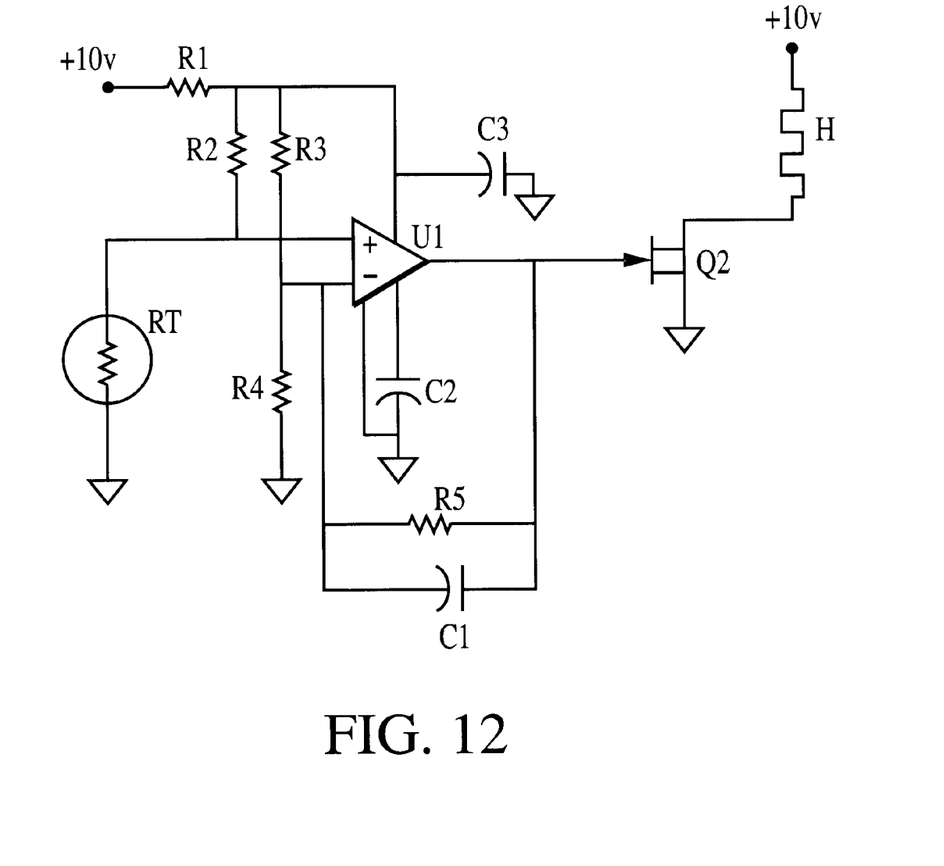
FIG. 12 is a circuit diagram of a heater control.

FIG. 12 is a circuit diagram of a heater control for use with the present invention. The purpose of this circuit is to temperature stabilize the resonators Y1 found in the oscillators 12a and 12b. The heater control circuit comprises a voltage comparator, U1, that monitors the output of a bridge comprising three (3) fixed resistors, R1 R2 R3, and a thermistor, RT. The output when the bridge is balanced is 5 volts. When the bridge is unbalanced, the output varies from approximately 0 to 10 volts. The fixed bridge resistors are selected such that when thermistor, RT, reaches 80 degrees Celsius, the bridge is balanced and the current through the heater circuit will be significantly reduced. The output of voltage comparator, U1, is amplified through a FET transistor amplifier, Q2. Q2 includes a heater component, H, in its drain. The heater component, H, is comprised of Advance wire that is a copper/nickel/resistance wire of approximately 100 ohms. When the bridge is unbalanced due to a cold thermistor, increased current flows through heater, H, at approximately 100 mA. This action provides heat until thermistor, RT, indicates the temperature is approaching 80 degrees Celsius as its resistance changes with the temperature. At 80 degrees, thermistor, RT, reaches a resistance equal to resistor R4 in the resistor bridge. Voltage comparator, U1, decreases the voltage to FET transistor, Q2, and the current through heater, H, is reduced. Heater, H, is wrapped around a crystal oven, which is contained in an insulating device. Once the resistor bridge is balanced at its operating temperature, heater, H, provides just enough heat required to maintain that temperature. The heat provided by heater, H, is roughly equivalent to the heat lost through the insulation.

One of ordinary skill in the art can readily augment values of certain circuit elements within the foregoing heater control circuit to achieve particular results or may even alter the topology of the circuit described without departing from the spirit or scope of the present invention.

Figure 13:
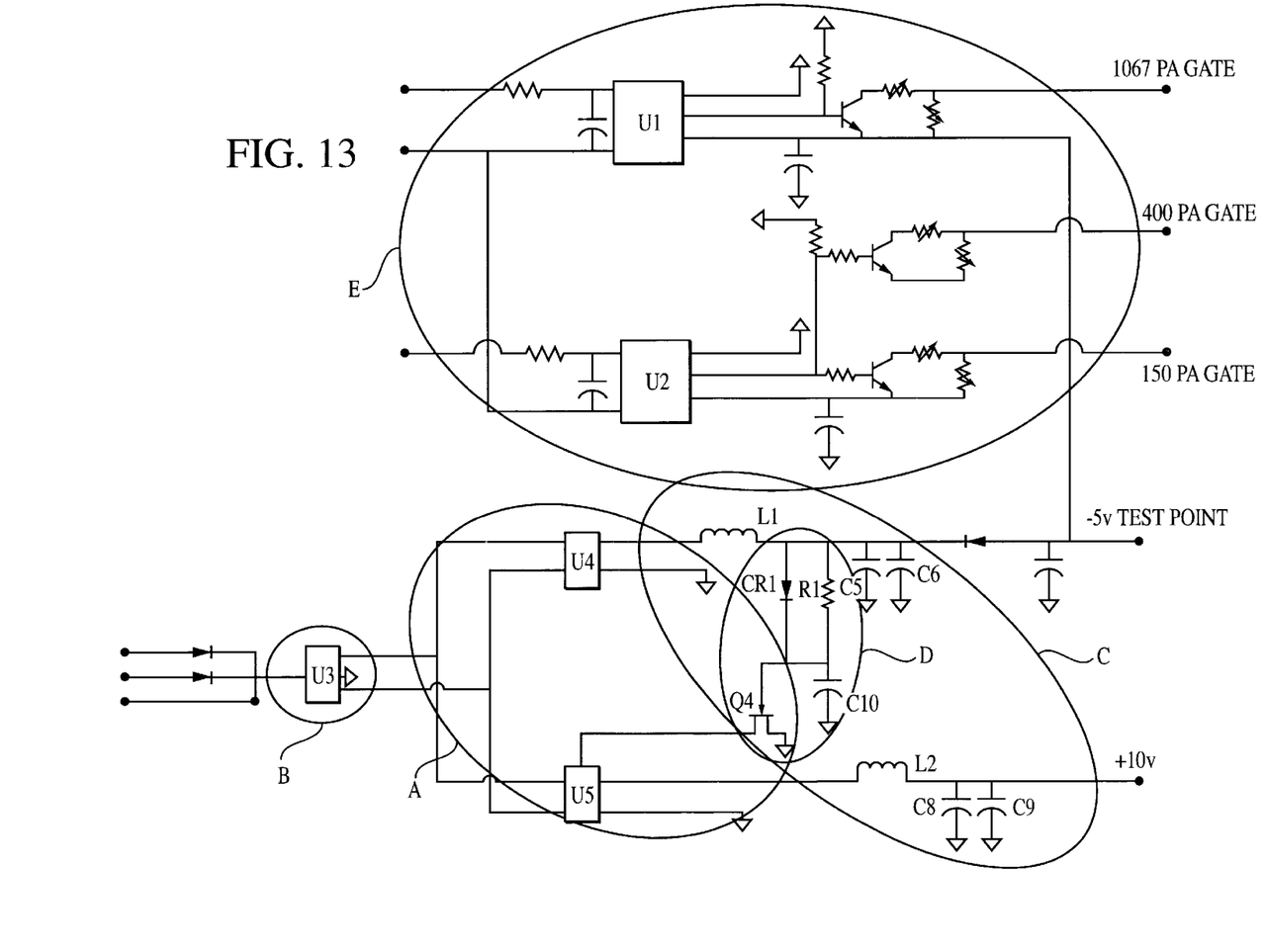
FIG. 13 is a circuit diagram of a power supply.

FIG. 13 is a circuit diagram of a power supply for use with the present invention. A pair of dc/dc converter switching type power supplies, U4 and U5, in circuit A receive EMI filtered input from the output of U3 in circuit B. The outputs of U4 and U5 are also filtered to reduce unwanted switching frequency ripple. Since U4 and U5 are switching type power supplies there is an AC component to the output that is undesired. The AC component is filtered using a series inductor shunt capacitor network, circuit C. Inductor L1 feeds capacitors C5 and C6 for the −5 volt output level while inductor L2 feeds capacitors C8 and C9 for the 10 volt output level. Circuit C reduces the AC component generated by the switching power supplies, U4 and U5.

Several control circuits are also included with the power supply. One of the control circuits is circuit D which is comprised of transistor Q4, a diode CR1, a resistor R1, and a capacitor C10. Circuit D functions to delay the turn-on of the 10 volt supply. This function is needed to protect the FET based amplifiers which could be damaged by application of the drain supply current prior to establishing the gate bias voltage. Circuit D feeds into the inhibit pin of the 10 volt supply U5 and ensures that −5 volts is present prior to turning on the 10 volt supply. Thus, circuit C provides the delay based on the time constant product of R1 and C10.

Two additional control circuits, E, independently control the gate bias levels that feed the FET transistor final amplifiers described in FIGS. 9, 10, and 11B. Altering the gate bias point changes the gain, output power, and DC current draw of the amplifiers. This allows operators on the ground to remotely vary the output power level between two states. When the spacecraft range to a ground station is small, the output power can be reduced, thus reducing the Beacon's power drawn from the spacecraft power bus.

Opto-isolators, U1 and U2, control a simple transistor on/off network that uses resistive networks to divide down the −5 volt from the power supply to various desired voltages to control the gates. For instance, with respect to the 1067 MHz amplifier, the two desired gate voltages are −1.1 or −2.5 volts depending on which level of operation is desired. There is a similar operation for the 150 MHz and 400 MHz amplifiers. This function can also be used to turn the amplifier completely off by reducing the gate voltage to the pinch-off level where the transistor draws no current.

One of ordinary skill in the art can readily augment values of certain circuit elements within the foregoing power supply 6circuit to achieve particular results or may even alter the topology of the circuit described without departing from the spirit or scope of the present invention.

In the following claims, any means-plus-function clauses are intended to cover the structures described herein as performing the recited function and not only structural equivalents but also equivalent structures. Therefore, it is to be understood that the foregoing is illustrative of the present invention and is not to be construed as limited to the specific embodiments disclosed, and that modifications to the disclosed embodiments, as well as other embodiments, are intended to be included within the scope of the appended claims. The invention is defined by the following claims, with equivalents of the claims to be included therein.

What is claimed is:

1. A radio frequency beacon comprising:
   an oscillator for generating a reference frequency signal;
   a multiplier circuit for receiving said reference frequency signal from said oscillator and multiplying said reference frequency signal to a desired broadcast frequency signal;
   an amplifier for receiving and amplifying said desired broadcast frequency signal; and
   a circuit enabling remote control of power out of said radio frequency beacon.

2. The radio frequency beacon of claim 1 wherein said reference frequency signal is approximately 16.7 MHz.

3. A radio frequency beacon comprising:
   an oscillator for generating a reference frequency signal;
   a multiplier circuit for receiving said reference frequency signal from said oscillator and multiplying said reference frequency signal to a desired broadcast frequency signal;
   an amplifier for receiving and amplifying said desired broadcast frequency signal; and
   a data encoder that mixes telemetry data with a pseudo-random code.

4. The radio frequency beacon of claim 3 further comprising a phase modulator, said phase modulator receiving a signal from said multiplier circuit and said data encoder and generating a phase modulated broadcast frequency signal having with telemetry data.

5. The radio frequency beacon of claim 1 wherein the circuit enables remote control of power out of said radio frequency beacon from full power to a reduced power.

6. The radio frequency beacon claim 1 wherein the circuit enables remote control of power out of said radio frequency beacon from full power to no power.

7. The radio frequency beacon of claim 1 further comprising a triplexer circuit, said triplexer circuit receiving multiple amplifier outputs and combining multiple amplifier outputs into a single port.

8. The radio frequency beacon of claim 2 wherein said multiplier circuit multiplies the reference frequency signal 9 times to achieve a broadcast frequency signal of 150 MHZ.

9. The radio frequency beacon of claim 8 wherein said 9 times multiplication is achieved using a combination of two times-3 multiplier circuits.

10. The radio frequency beacon of claim 2 wherein said multiplier circuit multiplies the reference frequency signal 24 times to achieve a broadcast frequency signal of 400 MHZ.

11. The radio frequency beacon of claim 10 wherein said 24 times multiplication is achieved using a series combination of a times-8 multiplier circuit and a times-3 multiplier circuit.

12. The radio frequency beacon of claim 2 wherein said multiplier circuit multiplies the reference frequency signal 64 times to achieve a broadcast frequency signal of 1067 MHZ.

13. The radio frequency beacon of claim 12 wherein said 64 times multiplication is achieved using a combination of two times-8 multiplier circuits.

14. The radio frequency beacon of claim 13 wherein said broadcast frequency signal of 1067 MHZ is phase modulated such that data can be placed on the broadcast frequency signal without disturbing the phase of the broadcast frequency signal.

15. A radio frequency beacon comprising:
   two nearly identical redundant oscillators each generating a reference frequency signal that is slightly different from the other, said radio frequency beacon capable of remotely switching between either oscillator;
   a multiplier circuit for receiving said reference frequency signal from one of said oscillators and multiplying said reference frequency signal to a desired broadcast frequency signal; and
   an amplifier for receiving and amplifying said desired broadcast frequency signal.

16. A radio frequency beacon for simultaneously broadcasting multiple signals of different frequencies comprising:
   two nearly identical redundant oscillators each generating a reference frequency signal, said radio frequency beacon capable of remotely switching between either oscillator;
   a plurality of multiplier circuits,
      wherein some multiplier circuits simultaneously receive said reference frequency signal and separately multiply said reference frequency signal in order to generate a plurality of multiplied signals; and
      wherein some of the plurality of multiplied signals are operated on by additional multiplier circuits,
      such that a plurality of desired broadcast frequency signals are generated and simultaneously transmitted;
   a phase modulator for modulating one of said plurality of desired broadcast frequency signals such that data can be added to said modulated desired broadcast frequency signal; and
   a plurality of amplifiers corresponding to said plurality of desired broadcast frequency signals for receiving and amplifying said desired broadcast frequency signals.

17. The radio frequency beacon of claim 16 wherein said reference frequency signal is approximately 16.7 MHz.

18. The radio frequency beacon of claim 17 wherein the number of desired broadcast frequency signals is three.

19. The radio frequency beacon of claim 18 wherein the frequency of the desired broadcast frequency signals includes signals that are approximately 150 MHz, 400 MHZ, and 1067 MHZ in frequency.

20. The radio frequency beacon of claim 19 wherein the 150 MHz signal is the product of said reference frequency signal being operated on by two consecutive times-3 multipliers.

21. The radio frequency beacon of claim 19 wherein the 400 MHz signal is the product of said reference frequency signal being operated on by a times-8 multiplier followed by a times-3 multiplier.

22. The radio frequency beacon of claim 19 wherein the 1067 MHz signal is the product of said reference frequency signal being operated on by two consecutive times-8 multipliers.

23. The radio frequency beacon of claim 22 wherein said 1067 MHz multiplied signal is phase modulated in order to add data to the 1067 MHZ signal such that said data can be transmitted from said radio frequency beacon.

24. A radio frequency beacon simultaneously broadcasting multiple signals, each signal of a different frequency, said radio frequency beacon comprising:

first and second oscillators for generating a reference frequency signal wherein said first and second oscillators are comprised of two nearly identical redundant oscillators, said radio frequency beacon capable of remotely switching between either oscillator;

a first multiplier circuit for receiving and multiplying said reference frequency signal to a first desired broadcast frequency signal;

a second multiplier circuit for receiving and multiplying said reference frequency signal to a second desired broadcast frequency signal;

a third multiplier circuit for receiving and multiplying said reference frequency signal to a third desired broadcast frequency signal;

a phase modulator for modulating one of said desired broadcast frequency signals such that data can be added to said modulated desired broadcast frequency signal; and a first amplifier for receiving and amplifying said first desired broadcast frequency signal;

a second amplifier for receiving and amplifying said second desired broadcast frequency signal;

a third amplifier for receiving and amplifying said third desired broadcast frequency signal; and transmission means for simultaneously transmitting said first, second, and third desired broadcast frequency signals.

* * * * *